United States Patent
Zhao et al.

(10) Patent No.: US 9,768,696 B2
(45) Date of Patent: Sep. 19, 2017

(54) DIRECT CURRENT TRANSMISSION INVERTER SIDE FREQUENCY CONTROL METHOD

(71) Applicants: NR Electric Co., Ltd., Nanjing, Jiangsu (CN); NR Electric Engineering Co., Ltd., Nanjing. Jiangsu (CN)

(72) Inventors: Wenqiang Zhao, Jiangsu (CN); Lin Li, Jiangsu (CN); Yongping Wang, Jiangsu (CN)

(73) Assignees: NR Electric Co., Ltd., Nanjing, Jiangsu (CN); NR Electric Engineering Co., Ltd., Nanjing, Jiangsu (CN)

( * ) Notice: Subject to any disclaimer, the term of this patent is extended or adjusted under 35 U.S.C. 154(b) by 0 days.

(21) Appl. No.: 15/116,877

(22) PCT Filed: Jan. 22, 2015

(86) PCT No.: PCT/CN2015/071278
§ 371 (c)(1),
(2) Date: Aug. 5, 2016

(87) PCT Pub. No.: WO2016/000446
PCT Pub. Date: Oct. 7, 2016

(65) Prior Publication Data
US 2017/0163158 A1    Jun. 8, 2017

(30) Foreign Application Priority Data
Jul. 4, 2014   (CN) .......................... 2014 1 0321630

(51) Int. Cl.
*H02M 5/45* (2006.01)
*H02M 3/24* (2006.01)
(Continued)

(52) U.S. Cl.
CPC ............... *H02M 3/24* (2013.01); *H02M 5/42* (2013.01); *H02M 5/45* (2013.01); *H02M 5/451* (2013.01); *H02M 5/458* (2013.01); *H02M 7/7575* (2013.01)

(58) Field of Classification Search
CPC .......... H02M 5/42; H02M 5/45; H02M 5/458; H02M 7/7575; H02M 5/451
See application file for complete search history.

(56) References Cited

U.S. PATENT DOCUMENTS 5,335,281 A * 8/1994 Tugenberg ................ H04L 9/32
                                                  370/474

FOREIGN PATENT DOCUMENTS

| CN | 87101909 | 9/1987 |
| CN | 1881728 | 12/2006 |

(Continued)

OTHER PUBLICATIONS

International Search Report of PCT/CN2015/071278 dated Apr. 14, 2015, 4 pages (English and Chinese).

*Primary Examiner* — Timothy J Dole
*Assistant Examiner* — Ishrat Jamali
(74) *Attorney, Agent, or Firm* — Rankin, Hill & Clark LLP

(57) ABSTRACT

A high voltage/ultrahigh voltage direct current transmission inverter side frequency control implementing method includes: transmitting a deviation between the inverter side power grid frequency and rated frequency to the inverter side frequency controller, wherein the frequency controller regulates and outputs a modulation quantity by adopting self-adaptive parameters according to different operation conditions; when the interstation communication is normal, the modulation quantity output of the inverter side frequency controller causes the rectifier side and the inverter side to form a new power/current order through the interstation (Continued)

communication; when the interstation communication is abnormal, converting the inverter side to current control from voltage control and converting the rectifier side to voltage control from current control; superposing the modulation quantity output of the inverter side frequency controller to the power/current order of the inverter side, changing the size of the transmission power to realizing the inverter side frequency control.

10 Claims, 3 Drawing Sheets

(51) Int. Cl.
*H02M 7/757* (2006.01)
*H02M 5/451* (2006.01)
*H02M 5/458* (2006.01)
*H02M 5/42* (2006.01)

(56) References Cited

FOREIGN PATENT DOCUMENTS

| | | |
|---|---|---|
| CN | 102969733 | 3/2013 |
| CN | 104052077 | 9/2014 |

* cited by examiner

DIRECT CURRENT TRANSMISSION INVERTER SIDE FREQUENCY CONTROL METHOD

BACKGROUND

The present invention relates to an inverter side frequency control method of high voltage direct current transmission and ultrahigh voltage direct current transmission systems, applied to the field of high voltage and ultrahigh voltage direct current transmission.

RELATED ART

Frequency control is a stable control method in high voltage/ultra high voltage direct current (HVDC) transmission systems, and fast controllability of the direct current system is used to achieve the aim of changing the frequency of a connected alternating current system by regulating the direct power. When the alternating current system connected to the direct current system is disturbed, the frequency control function can restore the alternative current system to be stable by regulating the transmission power of the direct current system. The frequency control is important especially when the received end alternating current power grid is a weak system.

In a conventional direct current system, the rectifier side adopts current (power) control, the inverter side adopts voltage or extinction angle control. Due to the current (power) control of the rectifier side, a conventional frequency controller in direct current is configured at the rectifier side; the frequency control of the inverter side is realized by transmitting the measured frequency value of the inverter side to the frequency controller at the rectifier side by interstation communication. But the interstation communication causes phase lag to the frequency controller and the control precision is affected. When the interstation communication is abnormal, the measured frequency value of the inverter side cannot be transmitted to the rectifier side. CN200510081612.9 provides a method of frequency control by regulating the direct voltage at the inverter side when the interstation communication has a fault. This method, on one aspect, reactive power loss is increased due to the reduced direct voltage, and the increase of the direct voltage will threaten the system safety, even cause commutation failure, one the other hand, the direct voltage is limited in regulating range and in slow regulating speed, resulting in a limited capability of frequency control. The paper of *simulation study of Frequency Modulation in Shengsi Direct Current system* in journal of *Electrical Equipment* in the ninth volume, 2008, proposed a direct current control method for the inverter side to realize the inverter side frequency control when the interstation communication is broken-down, but since the rectifier side operates at a fixed alpha angle, the system direct voltage cannot be regulated, the capability of frequency control is insufficient.

BRIEF DESCRIPTION

One objective of the present invention is to provide a high voltage/ultrahigh voltage direct current transmission inverter side frequency control method, which can realize fast and efficient control of the power grid frequency at inverter side.

In order to realize the objective, a technical solution of the present invention is a direct current transmission inverter side frequency control implementing method, characterized by comprising the following steps:

(1) acquiring the frequency control function state, executing a step (2) in an entering state, and finishing the frequency control in a quitting state;

(2) transmitting the deviation between the inverter side power grid frequency and rated frequency to the inverter side frequency controller, wherein the frequency controller regulates and outputs a modulation quantity $\Delta DP$ by adopting self-adaptive parameters according to different operation conditions;

(3) acquiring the interstation communication state, executing a step (4) when the interstation communication is normal; and executing steps (5), (6) and (7) if the interstation communication becomes failed from normal;

(4) causing the rectifier side and the inverter side to form a new power/current order through the interstation communication by the modulation quantity $\Delta DP$ output of the inverter side frequency controller, regulating by the power/current controller at the rectifier side according to the new power/current order, thus realizing the inverter side frequency control by changing the size of the transmission power; and finishing the frequency control function after the modulation quantity $\Delta DP$ is executed;

(5) converting the inverter side to current control from voltage control and converting the rectifier side to voltage control from current control;

(6) forcedly updating a current actually measured power value as the inverter side power order and keeping for t1 ms, wherein the operator can set a power order per se according to the scheduling instruction after t1 ms; forcedly outputting zero from the inverter side frequency controller within t2 ms, resetting the output of the frequency integral controller as zero, and normally working after t2 ms; forcedly quitting the rectifier side frequency controller and resetting the output of the frequency integral controller as zero;

(7) superposing the modulation quantity $\Delta DP$ output of the inverter side frequency controller to the power/current order of the inverter side, regulating by the power/current controller of the inverter side according to the new power/current order, thus realizing the inverter side frequency control by changing the size of the transmission power; and finishing the frequency control function after the modulation quantity $\Delta DP$ is executed.

In the solution:

The value range of t1 is 0-200 ms and the value range of t2 is 0-100 ms.

In the solution: the inverter side frequency control function is temporarily automatically quitted in the power/current increasing or decreasing process of any pole of the rectifier side or inverter side, and is automatically entered after the increasing or decreasing process is finished; the inverter side frequency control function is automatically quitted when the direct current cannot be changed and is automatically entered till the direct current can be changed.

In the solution: the modulation quantity $\Delta DP$ output of the inverter side frequency controller causes the rectifier side and the inverter side to form a new power/current order through the interstation communication means that when the power/current order is generated at the rectifier side, the modulation quantity $\Delta DP$ output of the inverter side frequency controller is transmitted to the rectifier side through the interstation communication and superposition to the power/current order of the rectifier side to generate a new power/current order, and the inverter side follows the new order through the interstation communication; when the power/current order is controlled to be generated by the inverter side, the modulation quantity ΔDP output of the inverter side frequency controller is directly superposed to the power/current order of the inverter side to generate a new power/current order, and the rectifier follows the new order by the interstation communication.

In the solution: the frequency controller works at the control pole, and the pole with normal interstation communication is prior at the control pole; the non-control pole traces the frequency controller output of the control pole; the direct current of the control pole cannot be changed, but the direct current of the non-control pole can be changed, the frequency control function of the control pole is not quitted, the modulation quantity generated by the frequency controller of the control pole is transmitted to the non-control pole by interpolar communication, and the non-control pole regulates the transmission power to control the frequency.

In the solution, a non-control pole traces the frequency controller output of the control pole means that the frequency controller output of the non-control pole traces the frequency controller output of the control pole all the time; the modulation quantity for power regulation of the non-control pole comes from the frequency controller output of the control pole.

In the solution: different operation conditions mean that a bi-pole power control mode has communications operated at different power levels; a mono-pole power control mode has communications operated at different power levels; a bi-pole power control mode has no communications operated at different power levels; a mono-pole power control mode has no communications operated at different power levels; a mono-pole current control mode has communications operated at different power levels; and a mono-pole current control mode has no communications operated at different power levels.

In the solution, the modulation power output of the frequency controller is distributed between the two poles based on the proportion of the operation direct voltage absolute values of the two poles and through a power limiting link.

In the solution, the inverter side frequency controller comprises a frequency proportional controller and a frequency integral controller; the frequency integral controller performs resetting with a coefficient k1 in the power/current increasing or decreasing process of any pole of the rectifier side or inverter side, the resetting process is stopped after the increasing or decreasing process is finished and the value range of k1 is 0-1.

In the solution, the interstation communication becomes failed from normal means that two poles both operate, and the interstation communication of the two poles becomes failed from normal; or two poles both operate, and the interstation communication of only one pole is normal, which becomes failed from normal; or only one pole operates, and the interstation communication of the pole becomes failed from normal.

The present invention has the beneficial effects of:

1, realizing fast and precise regulation to the power grid frequency of the inverter side and meeting the safe and stable operation requirements of the power grid of the inverter side under various working conditions;

2, solving the problem of the inverter side frequency control when the interstation communication is abnormal and realizing the fast and efficient regulation of the inverter side frequency in the case of the interstation communication failure.

DETAILED DESCRIPTION

Figure 1:
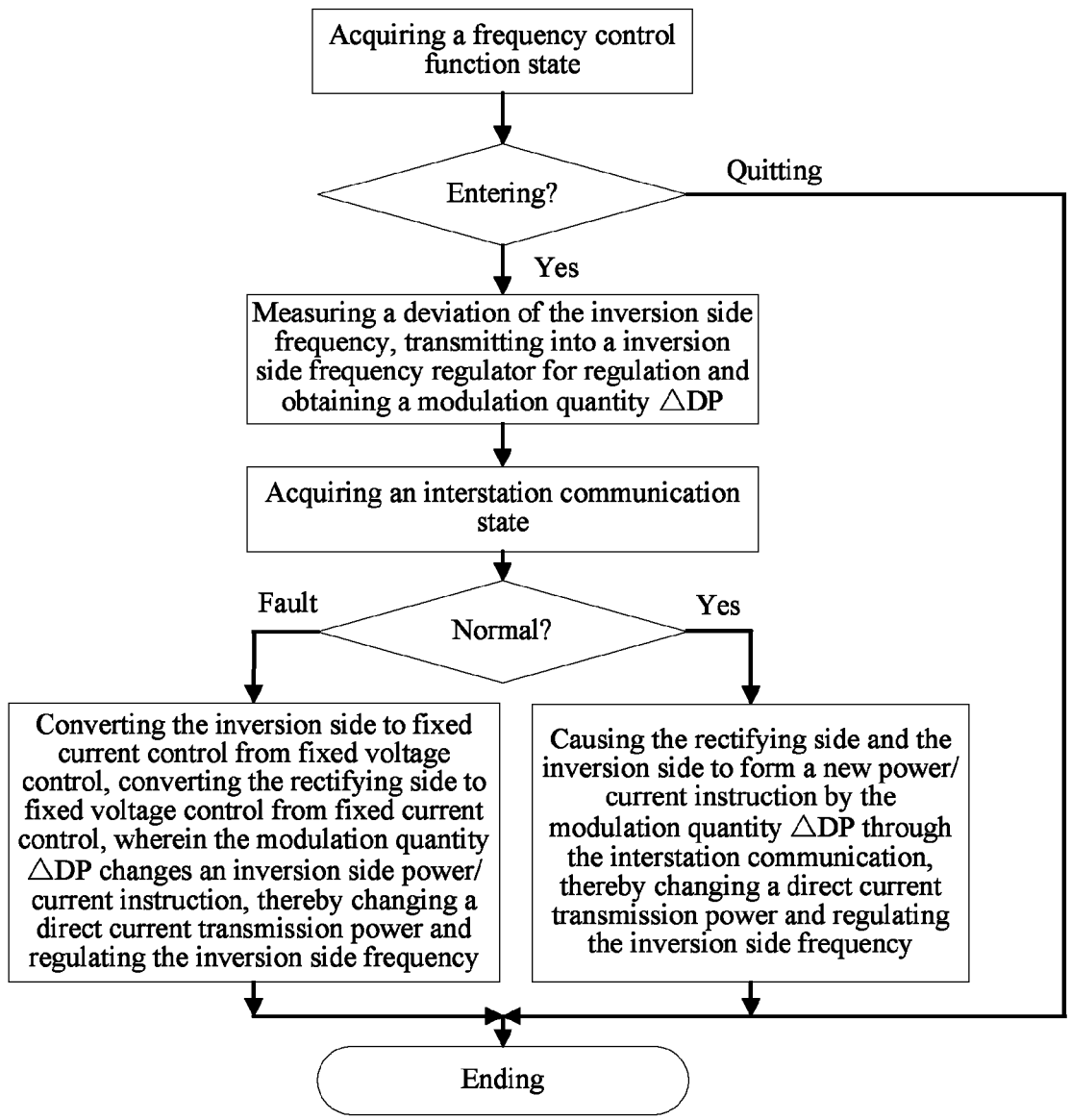
FIG. 1 is the flow chart of logic functions of the present invention.

The present invention provides a high voltage/ultrahigh voltage direct current transmission inverter side frequency control method, which can realize fast and efficient control of the power grid frequency at the inverter side. A technical solution of the present invention is described in combination with a logic function flow chart as shown in FIG. 1. The method specifically comprises the following steps:

(1) acquiring the frequency control function state set by an operator, executing the step (2) if the frequency control function is entered and in an entering state, and finishing the frequency control if the frequency control function is quitted;

The frequency control function state is affected by the following three aspects:

A, the inverter side frequency control function is temporarily automatically quitted in the power/current increasing or decreasing process of any pole of the rectifier side or inverter side, and is automatically entered after the increasing or decreasing process is finished;

B, the inverter side frequency control function is automatically quitted when the direct current cannot be changed and is automatically entered till the direct current can be changed. For example, for some HVDC project connected to a weak alternative current system, the operating direct voltage is usually lower than 70% of the rated direct voltage during the HVDC starting, in order to reduce the stress of the converter valve at this condition, the direct current is limited to be the minimal operation current, which cannot be increased as long as the operating voltage is lower than 70%, therefore, when the operating voltage is lower than 70% of the rated voltage, the frequency control function is automatically quitted and is automatically entered only the operation voltage is not lower than 70%.

C, the direct current of the control pole cannot be changed, but the direct current of the non-control pole can be changed, the frequency control function of the control pole is not quitted, the modulation quantity generated by the frequency controller of the control pole is transmitted to the non-control pole by interpolar communication, and the non-control pole regulates the transmission power to control the frequency.

Figure 2:
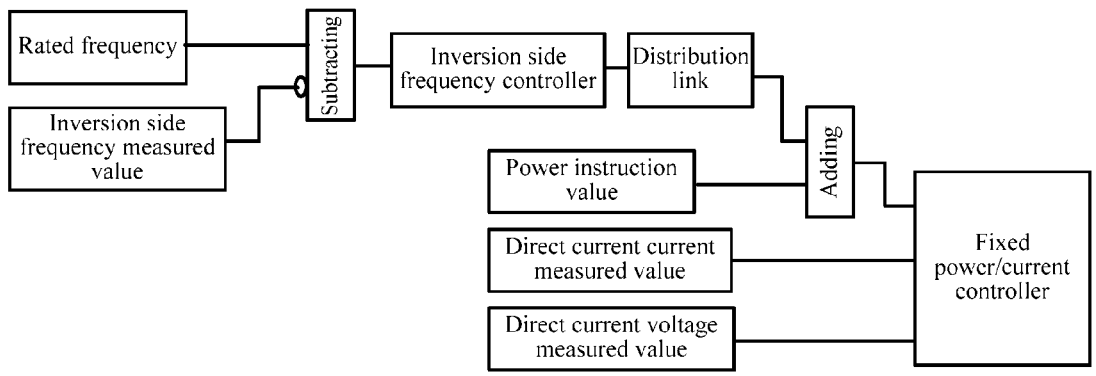
FIG. 2 is the whole logic block diagram of the inverter side frequency control in the present invention.

(2) As shown in FIG. 2, the rectifier controls the direct power/current when the interstation communication is normal; however, when the interstation communication is abnormal, the inverter controls the direct power/current. The deviation between the measured grid frequency of the inverter side and the rated frequency is input to the inverter side frequency controller, and the frequency controller regulates and outputs a modulation quantity ΔDP by adopting self-adaptive parameters according to different operation conditions. different operation conditions mean that a bi-pole power control mode has communications operated at different power levels; a mono-pole power control mode has communications operated at different power levels; a bi-pole power control mode has no communications operated at different power levels; a mono-pole power control mode has no communications operated at different power levels; a mono-pole current control mode has communications operated at different power levels; and a mono-pole current control mode has no communications operated at different power levels.

Herein, the frequency controller works at the control pole, and the non-control pole traces the frequency controller output of the control pole.

Figure 3:
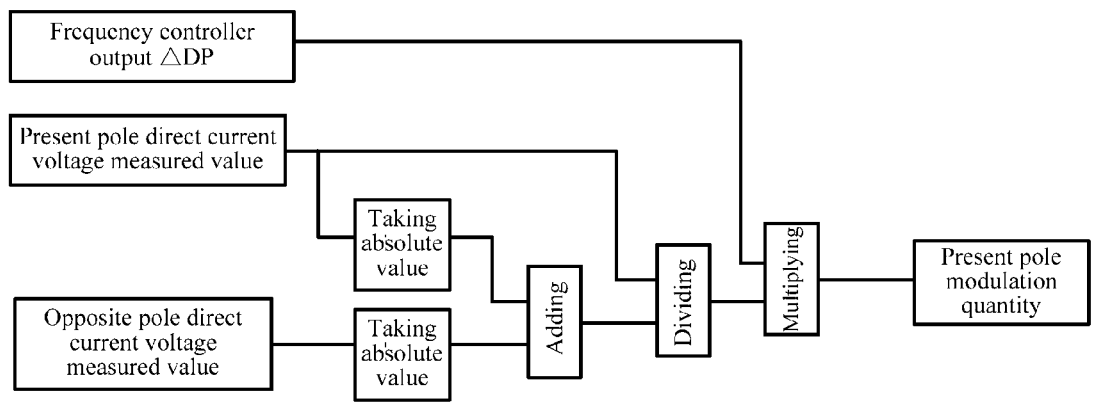
FIG. 3 is the distribution logic diagram of the output power ΔDP of the inverter side frequency controller between two poles in the present invention.

FIG. 3 shows that the modulation power output of the frequency controller is distributed between the two poles based on the proportion of the operation direct voltage absolute values of the two poles and through a power limiting link. For example, one pole operating direct voltage is 500 kV, the other pole operating direct voltage is 400 kV, then the pole with the direct voltage of 500 kV bears the modulation quantity of, and the pole with the direct current voltage of 400 kV bears the modulation quantity of.

A non-control pole traces the frequency controller output of the control pole means that the frequency controller output of the non-control pole traces the frequency controller output of the control pole all the time; the modulation quantity for power regulation of the non-control pole comes from the frequency controller output of the control pole.

Herein, the inverter side frequency controller comprises a frequency proportional controller and a frequency integral controller; the frequency integral controller performs resetting with a coefficient k1 in the power/current increasing or decreasing process of any pole of the rectifier side or inverter side, the resetting process is stopped after the increasing or decreasing process is finished and the value range of k1 is 0-1.

Figure 4:
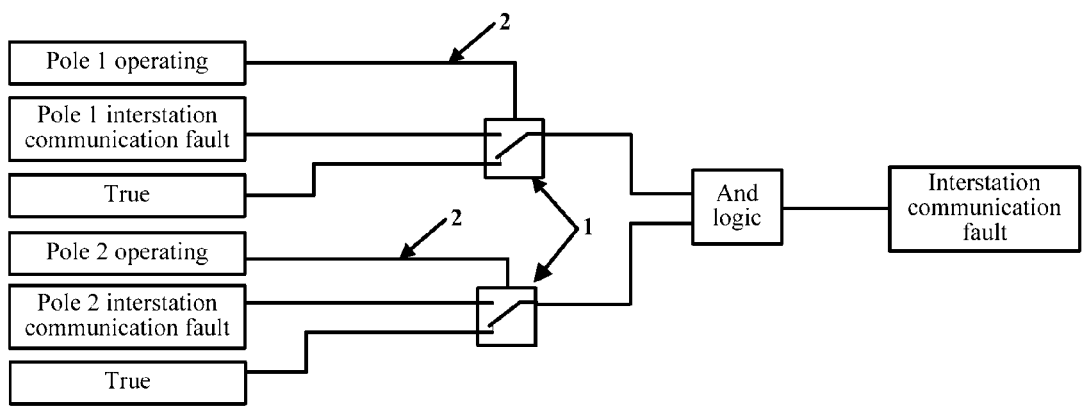
FIG. 4 is the judgmental logic diagram on the fault of interstation communication in the present invention.

(3) Acquiring the interstation communication state, executing the step (4) when the interstation communication is normal; and executing steps (5), (6) if the interstation communication becomes failed from normal, wherein, as shown in FIG. 4, the interstation communication becomes failed from normal means that two poles both operate, and the interstation communication of the two poles becomes failed from normal; or two poles both operate, and the interstation communication of only one pole is normal, which becomes failed from normal; or only one pole operates, and the interstation communication of the pole becomes failed from normal. For example, in FIG. 4, 1 is the selector and 2 is the selection signal. When 2 is true, the output of the selector is upper input, and 2 is false, the output of the selector is lower input. That is, when the pole 1 operation is true, the output of the selector is the pole 1 interstation communication fault, otherwise, the selector output is true; when the pole 2 operation is true, the output of the selector is the pole 2 interstation communication fault, otherwise, the selector output is true. Herein, the value of the pole 1 interstation communication fault or the pole 2 interstation communication fault or the interstation communication fault is true or false.

(4) causing the rectifier side and the inverter side to form a new power/current order through the interstation communication by the modulation quantity ΔDP output of the inverter side frequency controller, regulating by the power/current controller at the rectifier side according to the new power/current order, thus realizing the inverter side frequency control by changing the size of the transmission power; and finishing the frequency control function after the modulation quantity ΔDP is executed;

wherein, the modulation quantity ΔDP output of the inverter side frequency controller causes the rectifier side and the inverter side to form a new power/current order through the interstation communication means that when the power/current order is generated at the rectifier side, the modulation quantity ΔDP output of the inverter side frequency controller is transmitted to the rectifier side through the interstation communication and superposition to the power/current order of the rectifier side to generate a new power/current order, and the inverter side follows the new order through the interstation communication; when the power/current order is controlled to be generated by the inverter side, the modulation quantity ΔDP output of the inverter side frequency controller is directly superposed to the power/current order of the inverter side to generate a new power/current order, and the rectifier follows the new order by the interstation communication.

Figure 5:
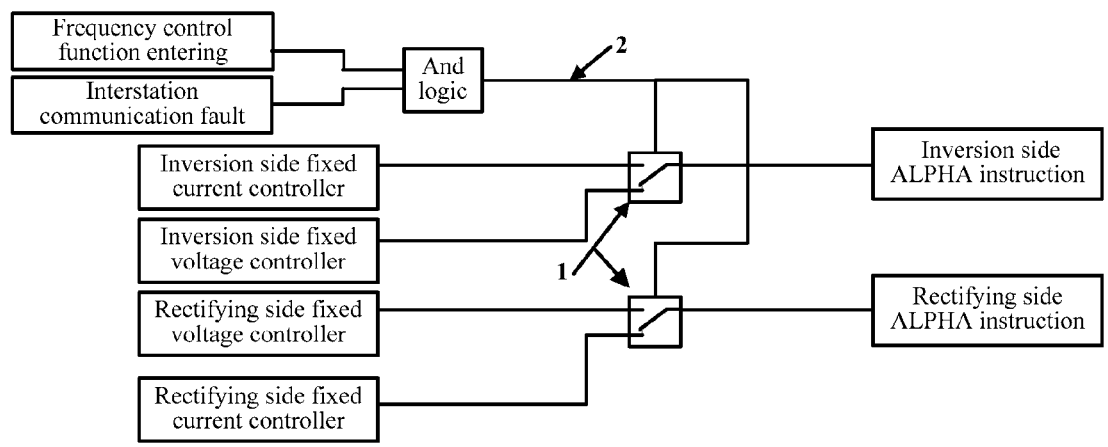
FIG. 5 is the logic diagram of the control strategy adjustment for both stations.

(5) As shown in FIG. 5, converting the inverter side to current control from voltage control and converting the rectifier side to voltage control from current control. In FIG. 5, 1 is a selector, and 2 is a selection signal. When 2 is true, the ALPHA order of the inverter comes from the current controller, and when 2 is false, the ALPHA order of the inverter comes from the voltage controller.

(6) forcedly updating a current actually measured power value as the inverter side power order and keeping for 0-200 ms, wherein the operator can set a power order per se according to the scheduling instruction after 0-200 ms; forcedly outputting zero from the inverter side frequency controller within 0-100 ms, resetting the output of the frequency integral controller as zero, and normally working after 0-100 ms; forcedly quitting the rectifier side frequency controller and resetting the output of the frequency integral controller as zero;

(7) superposing the modulation quantity ΔDP output of the inverter side frequency controller to the power/current order of the inverter side, regulating by the power/current controller of the inverter side according to the new power/current order, thus realizing the inverter side frequency control by changing the size of the transmission power; and finishing the frequency control function after the modulation quantity ΔDP is executed.

The invention claimed is:

1. A direct current transmission inverter side frequency control implementing method, comprising:
   (1) acquiring a frequency control function state, executing a step (2) in an entering state, and finishing frequency control in a quitting state;
   (2) transmitting a deviation between an inverter side power grid frequency and rated frequency to an inverter side frequency controller, wherein the inverter side frequency controller regulates and outputs a modulation quantity ΔDP by adopting self-adaptive parameters according to different operation conditions;
   (3) acquiring an interstation communication state, executing a step (4) when the interstation communication state is normal; and executing steps (5), (6) and (7) if the interstation communication state becomes failed from normal;
   (4) causing a rectifier side and an inverter side to form a new power/current order through interstation communication by a modulation quantity ΔDP output of the inverter side frequency controller, regulating by a power/current controller at the rectifier side according to the new power/current order, thus realizing inverter side frequency control by changing a size of transmission power; and finishing frequency control after the modulation quantity ΔDP is executed;

(5) converting the inverter side to current control from voltage control and converting the rectifier side to voltage control from current control;

(6) forcedly updating a current actually measured power value as an inverter side power order and keeping for t1 ms, wherein an operator can set a power order per se according to a scheduling instruction after t1 ms; forcedly outputting zero from the inverter side frequency controller within ms t2 ms, resetting an output of a frequency integral controller as zero, and normally working after t2 ms; forcedly quitting the rectifier side frequency controller and resetting the output of the frequency integral controller as zero;

(7) superposing the modulation quantity ΔDP output of the inverter side frequency controller to a power/current order of the inverter side, regulating by the power/current controller of the inverter side according to the new power/current order, thus realizing the inverter side frequency control by changing the size of the transmission power; and finishing the frequency control after the modulation quantity ΔDP is executed.

2. The direct current transmission inverter side frequency control implementing method according to claim 1, wherein the value range of t1 is 0-200 ms and the value range of t2 is 0-100 ms.

3. The direct current transmission inverter side frequency control implementing method according to claim 1, wherein an inverter side frequency control function is temporarily automatically quitted in a power/current increasing or decreasing process of any pole of the rectifier side or inverter side, and is automatically entered after the power/current increasing or decreasing process is finished; the inverter side frequency control function is automatically quitted when direct current cannot be changed and is automatically entered until direct current can be changed.

4. The direct current transmission inverter side frequency control implementing method according to claim 1, wherein the modulation quantity ΔDP output of the inverter side frequency controller causes the rectifier side and the inverter side to form a new power/current order through the interstation communication means that when the power/current order is generated at the rectifier side, the modulation quantity ΔDP output of the inverter side frequency controller is transmitted to the rectifier side through interstation communication and superposition to the power/current order of the rectifier side to generate a new power/current order, and the inverter side follows the new power/current order through the interstation communication; when the power/current order is controlled to be generated by the inverter side, the modulation quantity ΔDP output of the inverter side frequency controller is directly superposed to the power/current order of the inverter side to generate a new power/current order, and the rectifier follows the new order by the interstation communication.

5. The direct current transmission inverter side frequency control implementing method according to claim 1, wherein the frequency controller works at a control pole, and the control pole with normal interstation communication is prior at the control pole; a non-control pole traces a frequency controller output of the control pole; direct current of the control pole cannot be changed, but direct current of the non-control pole can be changed, frequency control function of the control pole is not quitted, a modulation quantity generated by the frequency controller of the control pole is transmitted to the non-control pole by interpolar communication, and the non-control pole regulates transmission power to control frequency.

6. The direct current transmission inverter side frequency control implementing method according to claim 5, wherein the non-control pole tracing the frequency controller output of the control pole means that the frequency controller output of the non-control pole traces the frequency controller output of the control pole all times; the modulation quantity for power regulation of the non-control pole comes from the frequency controller output of the control pole.

7. The direct current transmission inverter side frequency control implementing method according to claim 1, wherein different operation conditions mean that a bi-pole power control mode has communications operated at different power levels or has no communications operated at different power levels; a mono-pole power control mode has communications operated at different power levels or has no communications operated at different power levels; and a mono-pole current control mode has communications operated at different power levels or has no communications operated at different power levels.

8. The direct current transmission inverter side frequency control implementing method according to claim 1, wherein the modulation power output of the frequency controller is distributed between two poles based on a proportion of operation direct voltage absolute values of the two poles and through a power limiting link.

9. The direct current transmission inverter side frequency control implementing method according to claim 1, wherein the inverter side frequency controller comprises a frequency proportional controller and the frequency integral controller; the frequency integral controller performs resetting with a coefficient k1 in a power/current increasing or decreasing process of any pole of the rectifier side or inverter side, the resetting process is stopped after the power/current increasing or decreasing process is finished and the value range of k1 is 0-1.

10. The direct current transmission inverter side frequency control implementing method according to claim 1, wherein interstation communication becomes failed from normal means that two poles both operate, and the interstation communication of the two poles becomes failed from normal; or two poles both operate, and the interstation communication of only one pole is normal, which becomes failed from normal; or only one pole operates, and the interstation communication of the pole becomes failed from normal.

* * * * *